United States Patent
Takahashi

(10) Patent No.: US 7,948,532 B2
(45) Date of Patent: May 24, 2011

(54) SOLID-STATE IMAGE-PICKUP DEVICE SIGNAL PROCESSING APPARATUS WITH SIGNAL COMPENSATION CIRCUIT

(75) Inventor: Isao Takahashi, Yokohama (JP)

(73) Assignee: Jai Corporation, Yokohama-Shi, Kanagawa (JP)

( * ) Notice: Subject to any disclaimer, the term of this patent is extended or adjusted under 35 U.S.C. 154(b) by 1124 days.

(21) Appl. No.: 11/436,522

(22) Filed: May 19, 2006

(65) Prior Publication Data

US 2007/0268386 A1 Nov. 22, 2007

(51) Int. Cl.
 *H04N 5/217* (2006.01)
 *H04N 5/16* (2006.01)
 *H04N 5/228* (2006.01)

(52) U.S. Cl. ........................ 348/241; 348/257

(58) Field of Classification Search .................. 348/243, 348/251, 257
 See application file for complete search history.

(56) References Cited

U.S. PATENT DOCUMENTS

| | | | | |
|---|---|---|---|---|
| 5,926,214 A * | 7/1999 | Denyer et al. | | 348/241 |
| 6,115,066 A * | 9/2000 | Gowda et al. | | 348/308 |
| 7,113,203 B1 * | 9/2006 | Wu et al. | | 348/207.99 |
| 7,218,265 B2 * | 5/2007 | Roh et al. | | 341/169 |
| 7,221,396 B2 * | 5/2007 | Lenz | | 348/297 |
| 7,242,820 B2 * | 7/2007 | Nam | | 382/312 |
| 7,379,105 B1 * | 5/2008 | Frank et al. | | 348/242 |
| 2002/0167611 A1 * | 11/2002 | Boemler et al. | | 348/572 |
| 2004/0109070 A1 * | 6/2004 | Jung | | 348/230.1 |
| 2005/0017883 A1 * | 1/2005 | Lee | | 341/118 |
| 2005/0046715 A1 * | 3/2005 | Lim et al. | | 348/294 |

FOREIGN PATENT DOCUMENTS

| | | |
|---|---|---|
| JP | 2000-013691 | 1/2000 |
| JP | 2005318007 A * | 11/2005 |

* cited by examiner

*Primary Examiner* — David L Ometz
*Assistant Examiner* — Carramah J Quiett
(74) *Attorney, Agent, or Firm* — Manabu Kanesaka

(57) ABSTRACT

A solid-state image-pickup device signal processing apparatus includes a solid-state image-pickup device, an amplifier for amplifying an output signal of the solid-state image-pickup device, an A/D conversion circuit for converting an analog output signal of the amplifier to a digital signal, a digital correlated double sampling circuit for removing noises, and a device for supplying an optional-value direct current signal to a video signal portion of a digital output signal of the A/D conversion circuit. The digital correlated double sampling circuit subtracts a field-through portion of the digital output signal from the video signal portion including the optional-value direct current signal added thereto so that the optional-value direct current signal remains after subtracting the field-through portion from the video signal portion including the optional-value direct current signal when the solid-state image-pickup device image-picks up a dark space.

8 Claims, 6 Drawing Sheets

SOLID-STATE IMAGE-PICKUP DEVICE SIGNAL PROCESSING APPARATUS WITH SIGNAL COMPENSATION CIRCUIT

BACKGROUND ART

The present invention relates to signal processing of a solid-state image-pickup device, and more particularly to a solid-state image-pickup device signal processing apparatus using a digital correlated double sampling circuit.

A conventional example related to a CCD of a television camera using a solid-state image-pickup device (hereinafter, described as CCD) in general and a correlated double sampling circuit is shown in FIG. 5 and FIG. 6.

In a block diagram of a solid-state image-pickup device signal processing apparatus of a conventional example shown in FIG. 5, a CCD 1 has a bias power source supplied at a bias power source input terminal 1a and a driving pulse supplied at a driving pulse input terminal 1b. And the CCD 1 is operated as publicly known by being supplied with a reset pulse and a read pulse generated by a timing signal generating circuit (hereinafter, described as TSG) 2.

In an output waveform diagram of a conventional solid-state image-pickup device shown in FIG. 6, as an analog output signal obtained by being photoelectrically converted and outputted by the CCD 1, an output signal is obtained in which three periods of a reset period tR, a field-through zero level period tF and a video signal period tS are repeated, as shown in the figure. Fluctuations of reset potentials contained in a field-through zero level period tF and a video signal period tS of said output signal correlate with each other.

In order to obtain the difference between these two sample values and remove the effect of reset noises, an output signal of the CCD is supplied to a correlated double sampling circuit 4 through an amplifier 3.

The amplified output signal of the CCD is inputted into a field-through S/H (sample hold) 4a and a video signal S/H 4b, and a field-through level signal sample-held during a field-through period at a specified timing by a field-through sample pulse outputted from TSG 2 is applied to the minus terminal of a differential amplifier 4c.

On the other hand, a video signal sample-held during a video signal period tS in the video signal S/H 4b at a specified timing by a video signal sample pulse outputted from TSG 2 is applied to the plus terminal of the differential amplifier 4c, and the reset noises correlated with each other being contained in the respective signals are cancelled in output of the differential amplifier 4c and thereby an analog video signal in which reset noises have been removed is obtained in the output of the differential amplifier 4c.

The video signal outputted from the differential amplifier 4c is made proper by an amplifier 5 and is supplied to an analog/digital (A/D) conversion circuit 6, and the A/D conversion circuit 6 converts this signal to a digital signal according to an A/D clock pulse from TSG 2.

The digital signal outputted from said A/D conversion circuit 6 is formed into a digital video signal according to a specified form by a digital signal processing circuit 7 operated with a DSP clock pulse outputted from TSG 2 and is outputted from an output terminal 8.

[Patent literature 1] Japanese Patent Laid-Open Publication No. 2000-13691

As shown in the conventional example, since an analog correlated double sampling circuit uses many analog circuits assembled with discrete components such as a field-through S/H circuit for sample-holding a field-through level tF period for each picture element, similarly a video signal S/H circuit for sample-holding a video signal tS period for each picture element, a differential amplifier and the like, miniaturization of it has been difficult.

And deterioration in accuracy of a signal level caused by occurrence of droop and the like due to inter-electrode capacitance and the like of semiconductor parts in an S/H circuit and circuit noises due to the complexity of a circuit configuration have not been able to be neglected.

Further, a digital correlated double sampling circuit using a correlated double sampling circuit and having a plurality of functions such as a flaw compensation, a shading compensation and the like specific to CCD added to it is provided.

DISCLOSURE OF THE INVENTION

The present inventor has solved these problems by the following means as a result of earnest studies in consideration of the above-mentioned matter.

(1) A solid-state image-pickup device signal processing apparatus comprising a solid-state image-pickup device, an amplifier for amplifying an output signal of said solid-state image-pickup device, an A/D conversion circuit for converting an analog output signal of said amplifier to a digital signal and a digital correlated double sampling circuit for removing noises by performing a subtraction process between a field-through portion and its directly subsequent video signal portion of a digital output signal of said A/D conversion circuit, said apparatus being characterized in that said digital correlated double sampling circuit has an optional-value direct current signal added to said video signal portion.

(2) A solid-state image-pickup device signal processing apparatus according to item (1), wherein the optional-value direct current signal added to said video signal portion is variably controlled for each frame.

(3) A solid-state image-pickup device signal processing apparatus according to item (1) or (2), wherein the optional-value direct current signal added to said video signal portion is variably controlled for each of said video signal portions.

(4) A solid-state image-pickup device signal processing apparatus according to any of items (1) to (3), wherein said digital correlated double sampling circuit comprises a frame memory for storing the optional-value direct current signal added to said video signal portion and a address.

(5) A solid-state image-pickup device signal processing apparatus according to any of items (1) to (4), wherein said digital correlated double sampling circuit adds the optional-value direct current signal added to said video signal portion to a digital signal outputted from said A/D conversion circuit.

(6) A solid-state image-pickup device signal processing apparatus according to any of items (1) to (5), wherein the optional-value direct current signal added to said video signal portion is a direct current potential equivalent to a black level of a video signal.

(7) A solid-state image-pickup device signal processing apparatus according to any of items (1) to (6), wherein the optional-value direct current signal added to said video signal portion is a direct current potential equal to or greater than a maximum value of noises contained in a video signal.

According to the present invention, the following effects are exhibited.

1. According to the invention of item 1 of the present invention,
since said digital correlated double sampling circuit has an optional-value direct current signal added to said video signal portion and subtracts a field-through portion from said video signal portion, even if a video signal period is made to be at the zero level by a correlated double sampling operation in case that there is no signal due to no incident light in a photoelectrically converted output signal of a solid-state image-pickup device, for example by adding a direct current potential equal to or greater than the maximum value of noises as said optional-value direct current signal, a negative complement signal processing is made unnecessary in a digital signal processing, at a stage later than said digital signal processing circuit, for processing fixed pattern noises caused by irregularity in sensitivity of picture elements of the solid-state image-pickup device, shot noises, other noises due to an amplifier or the like, and the like, said noises having no correlation and being superposed on said video signal portion, and thereby it is possible to make the digital signal processing easier and to simplify the circuits at the same time. And it becomes possible to prevent erroneous operations such as black compression and the like in a digital signal processing circuit such as an A/D conversion circuit and the like at a stage later than this circuit.

And since a plurality of sample-hold circuits and amplifiers can be omitted, circuits are simplified and therefore there is not a problem specific to an analog circuit such as droop or the like of a sample-hold circuit and further it is possible to make a signal level higher in accuracy by making noises lower and make the apparatus more small-sized.

2. According to the invention of item 2 of the present invention, additionally to the effect of the previous item, since an optional-value direct current signal added to said video signal portion can be variably controlled for each frame, it is possible to match the black levels of R, G and B signals with one another by controlling said respective optional signal levels of R, G and B circuits in a 3-CCD camera or the like. Due to this, it is possible to eliminate the need of providing in particular a circuit for controlling the black level in each of the R, G and B circuits and therefore to simplify the circuits and reduce the cost.

3. According to the invention of item 3 of the present invention, additionally to the effects of the previous items 1 and 2, since an optional-value direct current signal added to said video signal portion can be variably controlled for each of said video signal portions, even if picture element defects such as white flaws, black flaws and the like of a solid-state image-pickup device are made, it is possible to make an image display configuration flaw-compensated so as to be inconspicuous in picture element defect by controlling said optional-value direct current signal for each picture element. Due to this, it is possible to eliminate the need of providing in particular a picture element defect compensation circuit which has been required for each solid-state image-pickup device and therefore to simplify the circuits and reduce the cost.

And even in case that picture element defects such as white flaws, black flaws and the like of a solid-state image-pickup device newly occur due to cosmic rays in the course of transportation using an aircraft or the like in particular, an on-site compensation is possible, and operations such as replacement, readjustment and the like of a solid-state image-pickup device can be omitted and thereby it is possible to greatly reduce the cost and shorten the period for delivery.

Further, it is possible also to compensate fixed pattern noises of CCD by means of a similar method to said flaw compensation.

Furthermore, even in case that a solid-state image-pickup device itself has shading, it is possible to make an image display configuration being inconspicuous in shading by controlling said optional-value direct current signal for each picture element. Due to this, it is possible to eliminate the need of providing in particular a shading compensation circuit which has been required for each solid-state image-pickup device and therefore to simplify the circuits and reduce the cost.

4. According to the invention of item 4 of the present invention, additionally to the effects of the previous items 1 to 3, since a frame memory for storing an optional-value direct current signal added to said video signal portion and its address is provided, it is possible to store in the frame memory said optional value direct current signals and their addresses for performing said offset electric potential addition, performing a black level compensation for each of R, G and B circuits and compensating the shading, picture element defects and the like of a solid-state image-pickup device itself, read said stored optional-value direct current signals and their addresses synchronously with a CCD driving operation, perform said digital correlated double sampling process and thereby automatically compensate the black level and the like of each of the respective R, G and B circuits.

Due to this, since it is not necessary to particularly provide each of the R, G and B circuits with a compensation circuit for the black level and the like, it is possible to simplify the circuits and reduce the cost.

Further, since it is possible to store in the frame memory said optional-value direct current signals and their addresses for compensating the shading of a solid-state image-pickup device itself, read said stored optional-value direct current signals and addresses synchronously with a CCD driving operation, automatically compensate the shading by means of said digital correlated double sampling process and thereby make an image display configuration being inconspicuous in shading, and since it is not necessary to particularly provide a shading compensation circuit which has been required for each solid-state image-pickup device up to now, it is possible to simplify the circuits and reduce the cost.

5. According to the invention of item 5 of the present invention, additionally to the effects of the previous items 1 to 4, since an optional-value direct current signal added to said video signal portion is added to a digital signal outputted from said A/D conversion circuit, digital signal processing at a stage later than said A/D conversion circuit is performed with no erroneous operation and high accuracy, and therefore it is possible to simplify an adjustment circuit, omit an adjustment operation and reduce the cost.

6. According to the invention of item 6 of the present invention, additionally to the effects of the previous items 1 to 5, since an optional-value direct current signal added to said video signal portion is at a direct current potential equivalent to the black level of a video signal, by detecting the output signal of an optical black portion light-shielded of CCD and feedback-controlling an optional-value direct current signal to be added to said video signal portion, it is possible to automatically compensate change in dark voltage caused by variation in operating temperature of CCD and stabilize the black level of a video signal.

7. According to the invention of item 7 of the present invention, additionally to the effects of the previous items 1 to 6, since the optional value of a direct current signal added to said video signal portion is at a direct current potential equal or approximate to the maximum value of noises contained in a video signal, even if a video signal period is made to be at the zero level by a correlated double sampling operation in case that there is no signal due to no incident light in a photoelectrically converted output signal of a solid-state image-pickup device, for example by adding a direct current potential equal to or greater than the maximum value of noises as said optional-value direct current signal, a negative complement signal processing is made unnecessary in a digital signal processing, at a stage later than said digital signal processing circuit, for processing fixed pattern noises caused by irregularity in sensitivity of picture elements of a solid-state image-pickup device, shot noises, other noises due to an amplifier or the like, and the like, said noises having no correlation and being superposed on said video signal portion, and thereby it is possible to make a digital signal processing easier and to simplify the circuits at the same time.

1: Solid-state image-pickup device (CCD), 1a: Bias power source input terminal, 1b: Driving pulse input terminal, 2: Timing signal generating circuit (TSG), 3, 5: Amplifier, 4: Correlated double sampling circuit, 6: A/D conversion circuit, 7: Digital signal processing circuit, 7a: Signal processing DSP, 7b: CPU, 7c: Frame memory, 8: Output terminal, 21: Three periods, 22: Output signal, 23: A/D clock pulse, 24, 31: Sequential digitally converted signal, 32: Adder, 33: Subtractor, 34: Correlated double sampling-processed video signal, 35: Optional-value direct current signal, 40: Output signal, 41: Bright field-through 0 level, 42: Bright video signal level, 43: Bright video signal range, 44: Dark field-through 0 level, 45: Dark video signal level, 46: Period in case of image-picking up a bright space, 47: Period in case of image-picking up a dark space, 48: Zero level, 49: Upper limit level of digital signals in A/D conversion, 50: A/D conversion range, 51: A/D clock pulse, 52, 55: Digital signal level of 50 LSB, 53: Bright picture digital signal level, 54: Bright picture digital signal range, 56: Dark picture digital signal level, 57: Lower limit level of digital signals, 58: Upper limit level of digital signals, 59: Whole range of digital signals, tR: Reset period, tF: Field-through 0 level period, tS: Video signal period, F1, F2, S1, S2: Digitally converted value

BEST MODE FOR CARRYING OUT THE INVENTION

Figure 5:
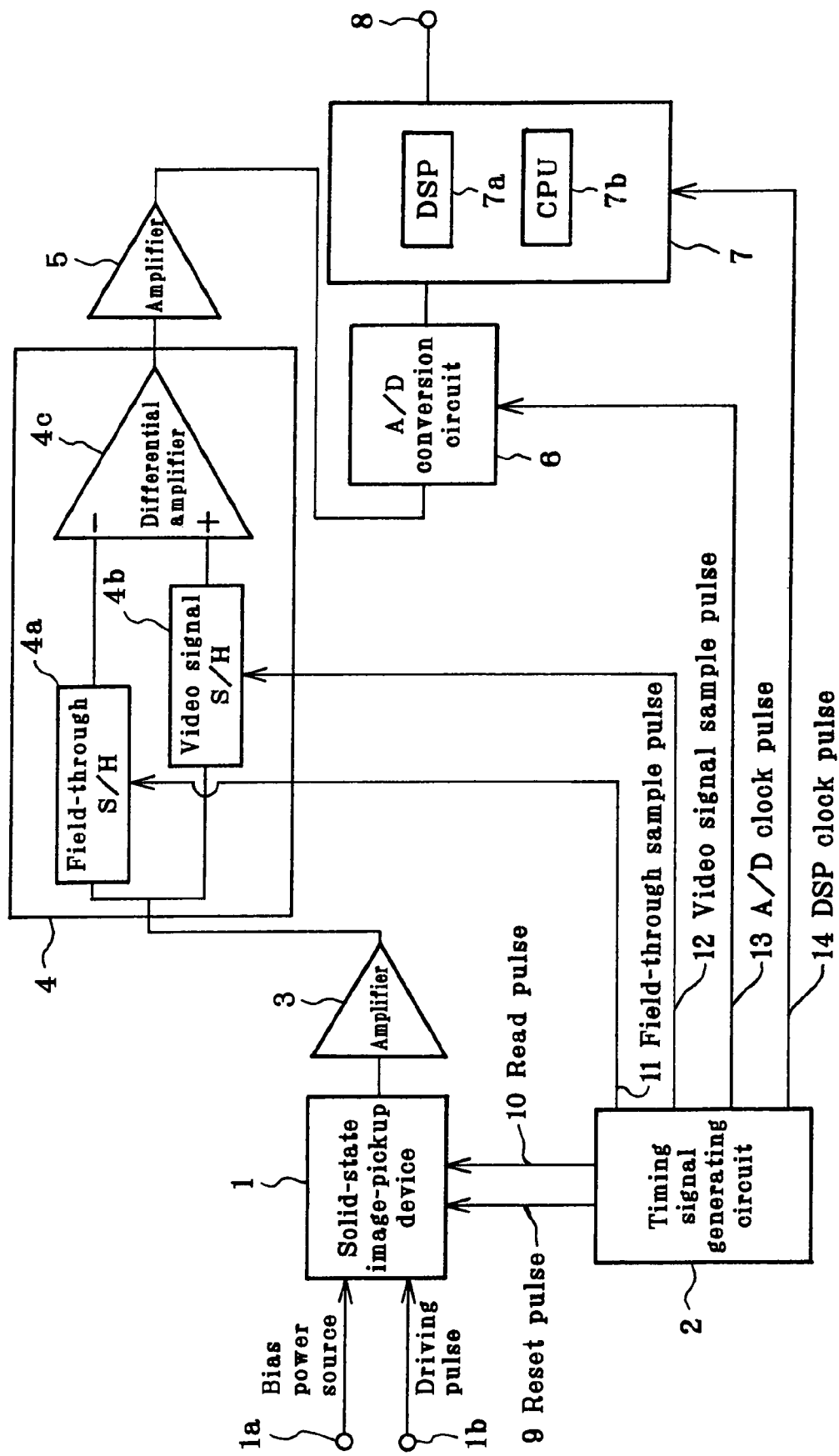
FIG. 5 is a block diagram of a solid-state image-pickup device signal processing apparatus of a conventional example.
Figure 6:
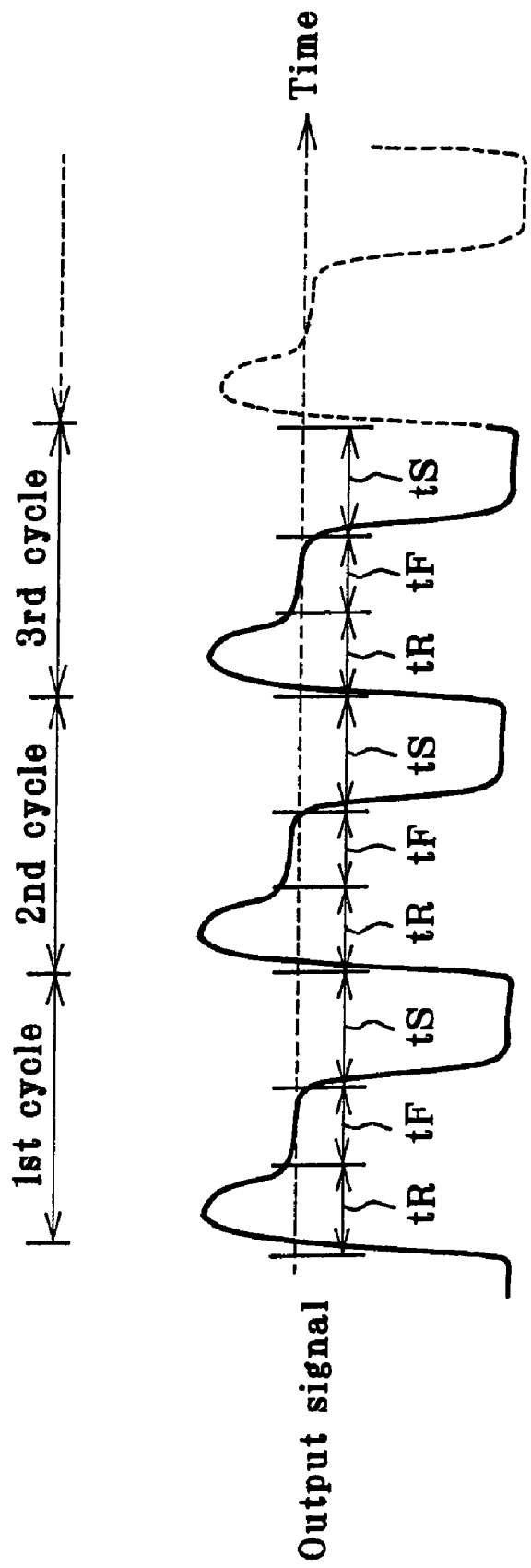
FIG. 6 is an output waveform diagram of a solid-state image-pickup device of a conventional example.

An embodiment of a solid-state image-pickup device signal processing apparatus of the present invention is described on the basis of drawings of the embodiment. Parts corresponding to FIGS. 5 and 6 are given the same symbols.

Figure 1:
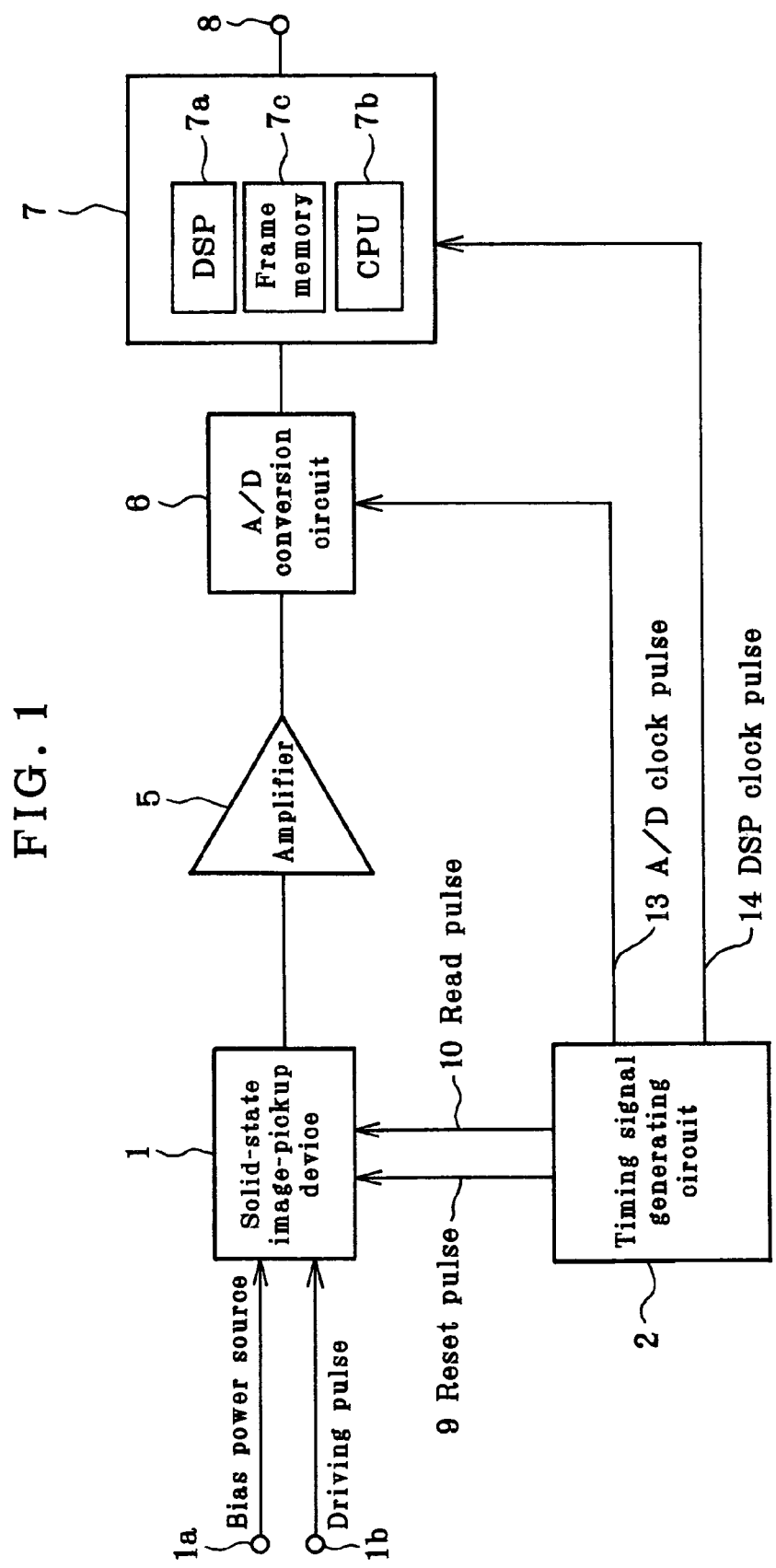
FIG. 1 is a block diagram of a solid-state image-pickup device signal processing apparatus of an embodiment of the present invention.
Figure 2:
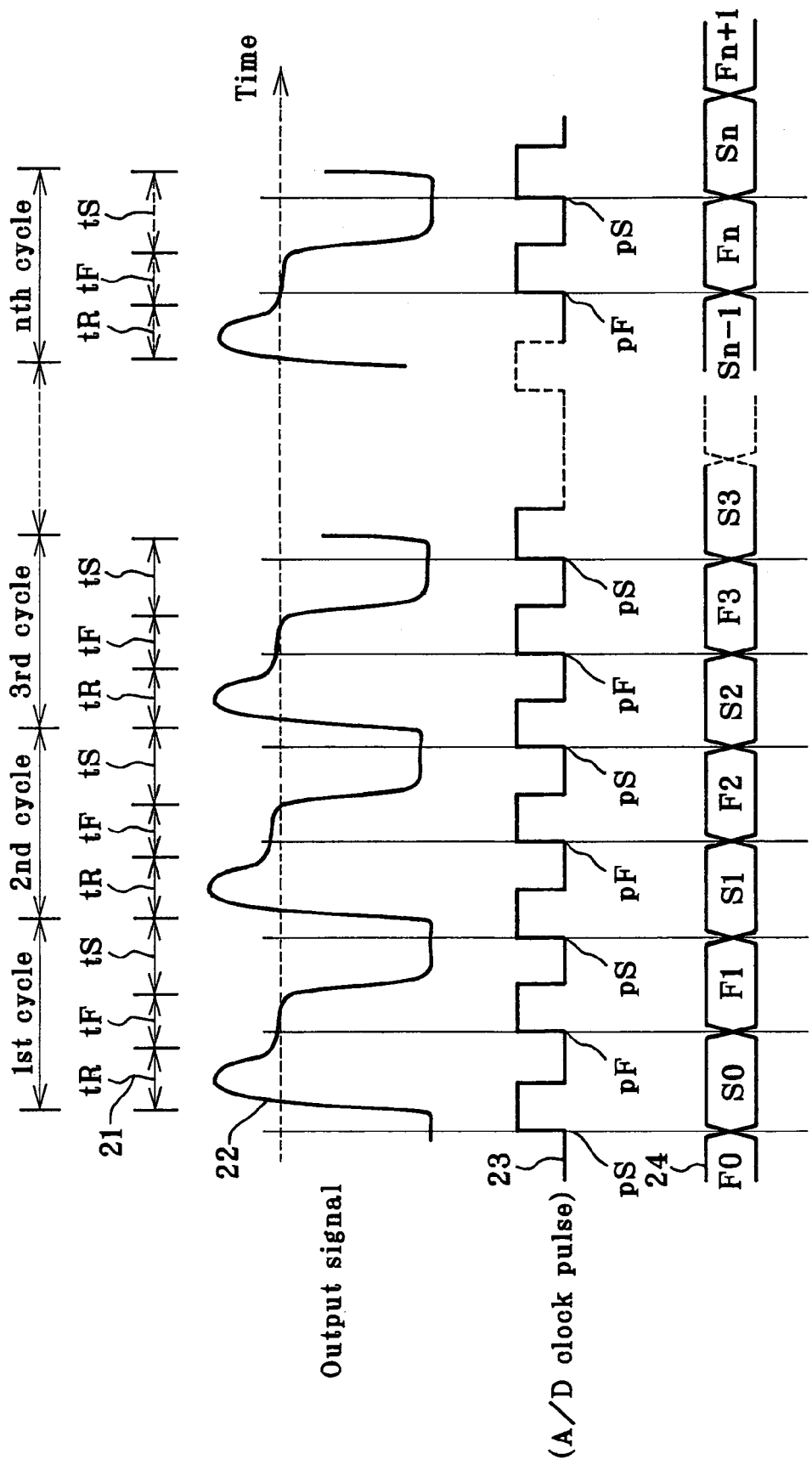
FIG. 2 is an output waveform and digitized signal waveform diagram of a solid-state image-pickup device of the same embodiment of the present invention.
Figure 3:
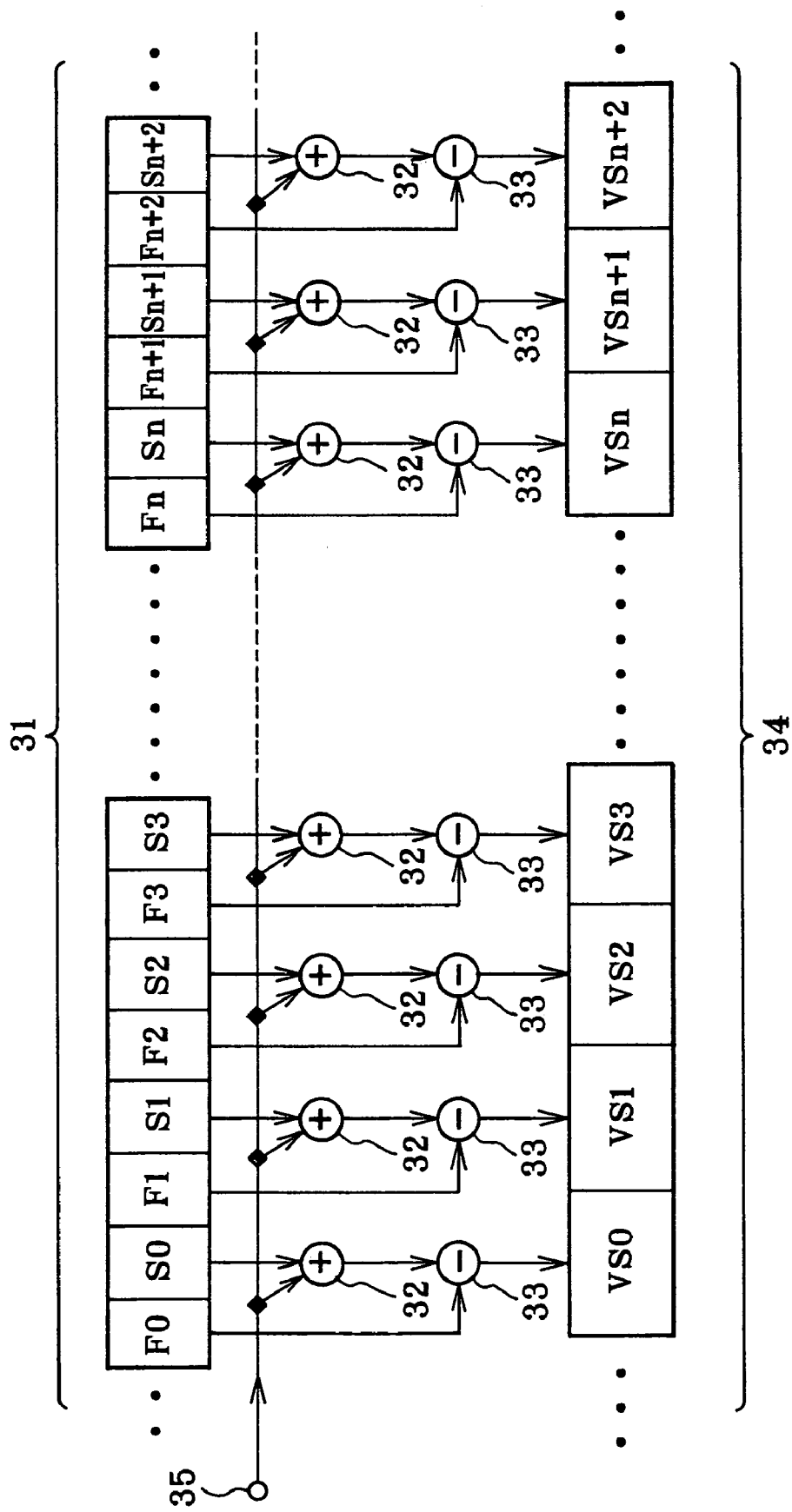
FIG. 3 is a schematic diagram for explaining a digital correlated double sampling operation and an operation of adding an optional-value direct current signal to said video signal portion.
Figure 4:
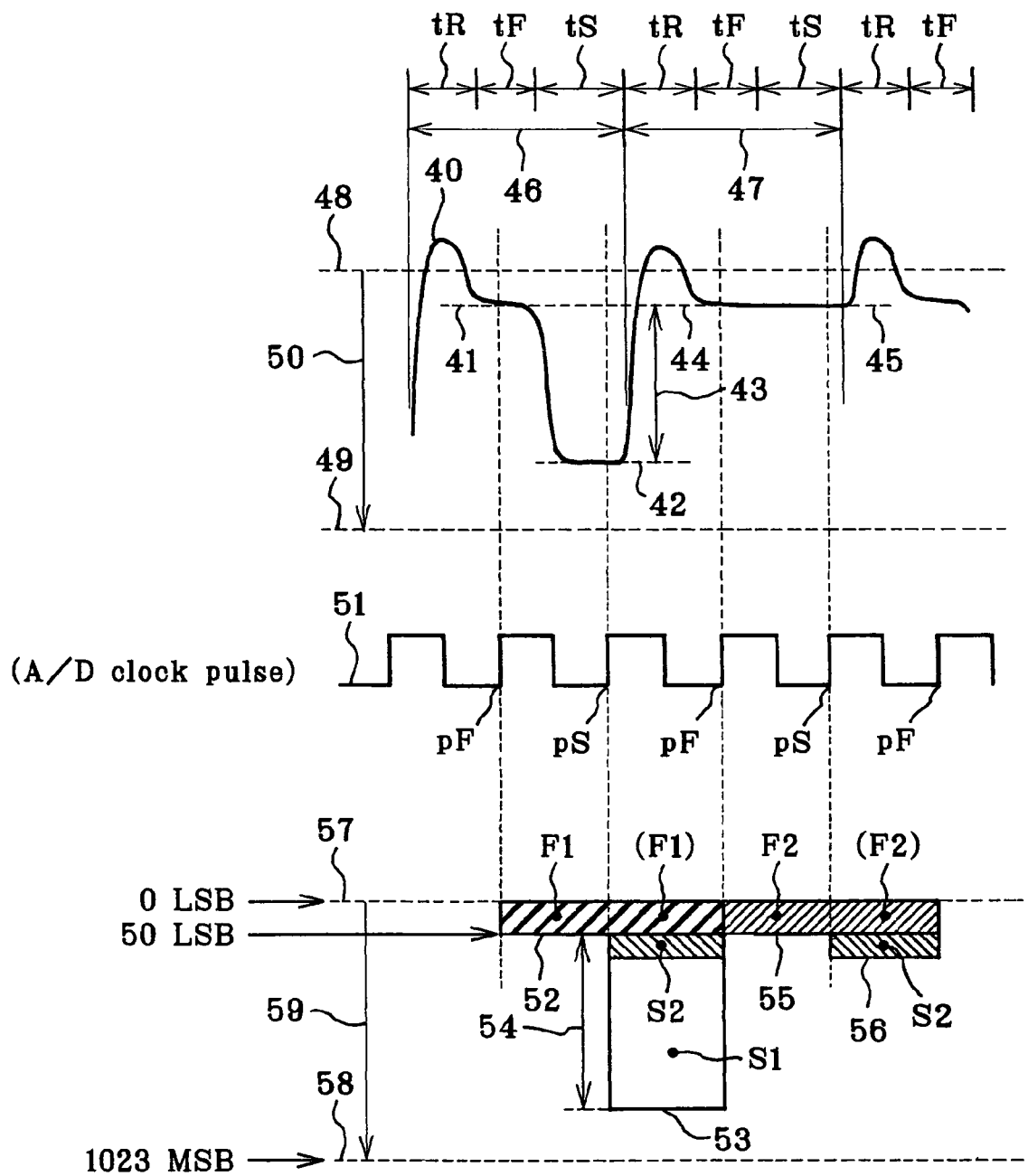
FIG. 4 is a schematized waveform diagram using digital values of a digital correlated double sampling circuit of the same embodiment of the present invention.

FIG. 1 is a block diagram of a solid-state image-pickup device signal processing apparatus of an embodiment of the present invention, FIG. 2 is an output waveform and digitized signal waveform diagram of a solid-state image-pickup device of the same embodiment of the present invention, FIG. 3 is a schematic diagram for explaining a digital correlated double sampling operation and an operation of adding an optional-value direct current signal to said video signal portion, and FIG. 4 is a schematized waveform diagram using digital values of the digital correlated double sampling of the same embodiment of the present invention.

In FIG. 1, a solid-state image-pickup device signal processing apparatus of an embodiment of the present invention is composed of a CCD (solid-state image-pickup device) 1, an amplifier 5 for amplifying an output signal of the CCD 1, an A/D conversion circuit 6 for converting an analog output signal of said amplifier 5 to a digital signal, a digital signal processing circuit 7 for performing a digital correlated double sampling operation removing noises by a subtraction process between a field-through portion of a digital output signal of said A/D conversion circuit 6 and its directly subsequent video signal portion, and a TSG 2 for sending control pulses to the CCD 1, the A/D conversion circuit 6 and the digital signal processing circuit 7.

The CCD 1 is supplied with a bias power source at a bias power source input terminal 1a and a driving pulse at a driving pulse input terminal 1b. The CCD 1 is operated as publicly known by being supplied with a reset pulse and a read pulse generated by the TSG 2.

An analog signal photoelectrically converted by the CCD 1 is amplified by the amplifier 5 to a specified level necessary for A/D conversion and is inputted into the A/D conversion circuit 6, and the A/D conversion circuit 6 operated by an A/D clock pulse generated by the TSG 2 converts said analog signal to a digital signal, which is supplied to the digital signal processing circuit 7.

Said digital signal processing circuit 7 is composed of a signal processing DSP (digital signal processor) 7a forming mainly a correlated double sampling circuit, a frame memory 7c and a CPU 7b for controlling the signal processing DSP 7a, the frame memory 7c, the TSG 2 and the like for processing a digital signal from said A/D conversion circuit 6, and is operated by a DSP clock pulse supplied from the TSG 2 and performs a correlated double sampling process by means of the digitized circuit.

In FIG. 2, an output signal 22 from said CCD 1 repeats three periods 21 of a reset period tR, a field-through 0 level period tF and a video signal period tS from the first and second cycles to the nth cycle. In this output signal 22, fluctuations in reset electric potential of a reset noise contained in a field-through 0 level period tF and a reset noise contained in a video signal period tS correlate with each other.

The output signal 22 being an analog signal of said CCD 1 is inputted into the A/D conversion circuit and is converted to a digital signal by resetting a field-through 0 level period tF by the rise-up pF of an A/D clock pulse 23 at a double sampling frequency, resetting a video signal period tS by the rise-up pS and performing an over-sampling process.

In such a way, at the time of resetting and A/D-converting a field-through 0 level period tF and a video signal period tS of an output signal 22 from said CCD 1, a sequential digitally converted signal 24 of F0, S0, F1, S1, F2, S2 to Fn and Sn is obtained as shown by 24.

Hereupon, reset noises contained in a field-through 0 level period tF and a video signal period tS of said sequential digitally converted signal 24 correlate with each other as described above.

In a schematic diagram for explaining a digital correlated double sampling operation and an operation of adding an optional-value direct current signal to said video signal portion of FIG. 3, signals S0, S1, S2 to Sn+2 of video signal periods tS of said sequential digitally converted signal 31 (being the same as the sequential digitally converted signal 24 in FIG. 2) of F0, S0, F1, S1, F2, S2 to Fn+2 and Sn+2 being an output signal over-sampling processed and digitized by the D/A conversion circuit 6 at a double sampling frequency are respectively added to terminals of adders 32.

On the other hand, optional-value direct current signals 35 each corresponding to a picture element, set respectively to optional-value direct current signal levels and digitized are provided to the other terminals of said adders 32 and are added respectively to signals S0, S1, S2 to Sn+2 of the video signal periods tS.

And signals F0, F1, F2 to Fn+2 of field-through 0 level periods tF in said sequential digitally converted signal 31 being a digitized output signal of the A/D conversion circuit 6 are added respectively to terminals of subtractors 33, while said signals S0, S1, S2 to Sn+2 which optional-value direct current signals outputted from said adders 32 have been added to are provided to the other terminals of the subtractors 33 and as a result, video signals VS0, VS1 to VSn+2 being video signals 34 each having received a correlated double sampling process are obtained as outputs of the subtractors 33.

The respective sequential digitally converted signals 31 being said signals F0, F1, F2 to Fn+2 and said signals S0, S1, S2 to Sn+2 each having received an over-sampling process performed by an A/D clock pulse being a clock pulse being two times a sampling frequency receive said correlated double sampling process performed by the subtractors 33, are digitized at the sampling frequency, have optional-value direct current signals added to them, and provide a video signal 34 of a standard form.

FIG. 4 is a schematized waveform diagram using digital values of the digital correlated double sampling, and digitally converted value levels in said digital signal processing circuit 7 in case that CCD 1 image-picks up a bright space and in case that it image-picks up a dark space are described.

An output signal 40 (corresponding to the output signal 22 of FIG. 2) of said CCD 1 is composed of three periods of a reset period tR, a field-through 0 level period tF and a video signal period tS, and in period 46 in case that the CCD 1 image-picks up a bright space and in period 47 in case that it image-picks up a dark space, number 48 corresponds to the zero level (corresponding to 0 LSB), and number 49 corresponds to the upper limit level of a digital signal at the time of A/D conversion in case of adjusting to a specified input range of the A/D conversion circuit 6 and is 1023 MSB in case of an A/D conversion circuit of 10 bits for example. Number 50 shows an A/D conversion range.

And number 41 shows the 0 level of a bright field-through, number 42 shows a bright video signal level and number 43 shows a bright video signal range.

Number 44 shows the 0 level of a dark field-through and number 45 shows a dark video signal level.

As described above, the output signal 40 of said CCD 1 being an analog signal sample-holds a field-through 0 level period tF by the rise-up pF of an A/D clock pulse 51 converting to a digital signal and sample-holds a video signal period tS by the rise-up pS.

A bright field-through 0 level period tF sample-held by the rise-up pF of an A/D clock pulse 51 is digitized to become a digitally converted value F1 having a digital signal level 52 of 50 LSB, and a bright video signal period tS sample-held by the rise-up pS is digitized to become a digitally converted value S1 of a bright video signal level 53 including a noise (F1) correlating with said digitally converted value F1 and a digitally converted value S2 of an optional-value direct current signal. Number 54 is a bright picture digital signal range.

Similarly, a dark field-through 0 level period tF sample-held by the rise-up pF of an A/D clock pulse 51s digitized to become a digitally converted value F2 having a digital signal level 55 of 50 LSB, and a dark video signal period tS sample-held by the rise-up pS is digitized to become a dark video signal level 56 including a noise (F2) correlating with the digitally converted value F2 and a digitally converted value S2 of an optional-value direct current signal.

Hereupon, the respective digitally converted values F1 and (F1)+S1, and F2 and (F2)+S2 receive a correlated double sampling process and VS0, VS1 to VSn+2 being video signals 34 of a standard form to which a digitally converted value S2 of an optional-value direct current signal is added are obtained.

As this result, since a digitally converted value S2 of an optional-value direct current signal has been added to said dark video signal level 56, even if a correlated double sampling process is performed and the digitally converted value (F2) is subtracted from the dark picture digital signal level 56 by the subtractor 33, said digitally converted value S2 remains in the dark video signal and therefore there is no noise under 0 LSB being the lower limit level 57 of a digital signal.

Here, number 58 is 1023 MSB being the upper limit level of a digital signal and number 59 shows the whole range of a digital signal.

Since ordinarily noise components of a video signal include fixed pattern noises caused by irregularity in sensitivity of picture element of CCD, shot noises and other noises due to an amplifier and the like which do not correlate with one another and these noises are superposed on said video signal portion, a digital signal processing in the negative range of these noises needs a negative complement signal processing.

However, if for example a digitally converted value equal to or greater than the maximum value of noises is given to said video signal portion as an optional-value direct current signal, the present invention does not need a negative complement signal processing in a digital signal processing at a stage later than said digital signal processing circuit 7 and facilitates a digital signal processing and can simplify the circuit at the same time.

Since in addition to the above-mentioned digital correlated double sampling process, it is possible to add an optional-value direct current signal to said video signal portion and variably control the optional-value direct current signal added to said video signal portion for each frame, it is possible to match the black levels of R, G and B signals with one another by controlling said optional-value direct current signal of each of the R, G and B circuits in a 3-CCD camera and the like. And it is possible also to simultaneously control the black levels of three channels of R, G and B signals. Due to this, it is not necessary to particularly provide each of the R, G and B circuits with a circuit for controlling the black level.

And since it is possible to level-control an optional-value direct current signal added to said video signal portion for each video signal portion, in FIG. 3 the compensation of a flaw-generating phenomenon caused by irregularity in dark voltage (or dark current) for each picture element of a solid-state image-pickup device can make an image display configuration in which no flaw is conspicuous by compensating a picture element defect such as a white flaw, black flaw or the like for each picture element in case of keeping a flaw dark voltage level to be compensated and its flaw address stored in said frame memory 7c (see FIG. 1), reading them and controlling said optional-value direct current signal 35, and performing an addition or subtraction (adding a negative signal) process by means of the adder 32. Due to this, it is not necessary to particularly provide a picture element defect compensation circuit which has been required for each solid-state image-pickup device.

Further, it is possible also to compensate fixed pattern noises of CCD 1 by means of a similar method to said flaw compensation.

Furthermore, similarly to said flaw compensation, it is possible to make an image display configuration having no shading by keeping a shading level of a solid-state image-pickup device itself and its address stored in said frame memory 7c (see FIG. 1), reading them and controlling said optional-value direct current signal 35, and performing a subtraction (adding a negative signal) process by means of the adder 32, and therefore it is not necessary to particularly provide a shading compensation circuit which has been required for each solid-state image-pickup device.

Additionally to the above-mentioned effects, since an optional-value direct current signal added to said video signal portion is at a direct current potential equivalent to the black level of a video signal, it is possible to automatically compensate variation in dark voltage (or dark current) caused by change in operating temperature of CCD and stabilize the black level of a video signal by adding up and averaging a plurality of said video signal portions of a light-shielded optical black portion of CCD and feedback-controlling an optional-value direct current signal to be added to said video signal portion, similarly to said shading compensation.

Instead of adding an optional-value direct current signal to be added to said video signal portion at a stage later than said A/D conversion circuit 6, it is acceptable also to add it through controlling the A/D conversion circuit 6 or add it as an analog signal to said amplifier 5.

Since the present invention not only digitalizes a correlated double sampling circuit but also can use concurrently a plurality of compensation functions indispensable for a CCD camera by utilizing its function, it can make CCD cameras more small-sized, more reliable and more high-performance due to digitization, and therefore is great in industrial applicability.

What I claim is:

1. A solid-state image-pickup device signal processing apparatus comprising:
    a solid-state image-pickup device, an amplifier for amplifying an output signal of said solid-state image-pickup device,
    an A/D conversion circuit for converting an analog output signal of said amplifier to a digital signal,
    a digital correlated double sampling circuit for removing noises, and
    a means for adding optional-value direct current signals to video signal portions of digital output signals of said A/D conversion circuit, each of said optional-value direct current signals corresponding to a picture element from the solid state image-pickup device and being set to an optional-value direct current signal level and digitized,
    wherein said digital correlated double sampling circuit subtracts a field-through portion of said digital output signal from said video signal portion including said optional-value direct current signal so that said optional-value direct current signal remains after subtracting said field-through portion from said video signal portion including said optional-value direct current signal when said solid-state image-pickup device image-picks up a dark space.

2. The solid-state image-pickup device signal processing apparatus according to claim 1, wherein the optional-value direct current signal added to said video signal portion is variably controlled for each frame.

3. The solid-state image-pickup device signal processing apparatus according to claim 1, wherein the optional-value direct current signal added to said video signal portion is variably controlled for each of said video signal portions.

4. The solid-state image-pickup device signal processing apparatus according to claim 1, wherein said digital correlated double sampling circuit comprises a frame memory for storing the optional-value direct current signal added to said video signal portion and an address thereof.

5. The solid-state image-pickup device signal processing apparatus according to claim 1, wherein the optional-value direct current signal added to said video signal portion is a direct current potential equivalent to a black level of the video signal.

6. The solid-state image-pickup device signal processing apparatus according to claim 1, wherein the optional-value direct current signal added to said video signal portion is a direct current potential equal to or greater than a maximum value of noises contained in the video signal.

7. The solid-state image-pickup device signal processing apparatus according to claim 1, further comprising a plurality of adders adding a plurality of said optional-value direct current signals to a plurality of said video signal portions.

8. The solid-state image-pickup device signal processing apparatus according to claim 1, wherein said optional-value direct current signal is negative.

* * * * *